March 29, 1966 G. C. SZIKLAI 3,243,740

REACTANCE ENHANCING NETWORKS

Filed Oct. 20, 1960

WITNESSES

Leon M. Garman

James F. Young

INVENTOR

George C. Sziklai

BY Ernest P. Klipfel

ATTORNEY 3,243,740
Patented Mar. 29, 1966

1

3,243,740

REACTANCE ENHANCING NETWORKS

George C. Sziklai, Carnegie, Pa., assignor to Westinghouse Electric Corporation, East Pittsburgh, Pa., a corporation of Pennsylvania Filed Oct. 20, 1960, Ser. No. 63,867
2 Claims. (Cl. 333—80)

The present invention relates generally to reactance enhancing networks and more particularly to a reactance enhacing network wherein positive and negative reactances are combined to produce a reactance of large value.

In my copending application, Serial No. 63,866 filed October 20, 1960, and assigned to the same assignee, it has been disclosed and claimed how a negative inductance or negative capacitance can be produced by a combination of positive and negative resistances and a capacitance or inductance. In the same application, it was demonstrated how a negative inductance in series circuit relationship with a positive inductance will cancel and thus provide a flat frequency response as well as eliminate switching transients across switching means which may be within the circuit.

The present invention provides considerable enhancement of a positive reactance by providing a negative reactance of similar magnitude and connecting them in such a manner that the effective reactance across the terminals of the enhancing network will approach infinity. The enhancement of an inductance type network is accomplished by connecting a positive inductance and a negative inductance in parallel. The enhancement of a capacitance type network is accomplished by connecting a positive capacitance and a negative capacitance in series.

A relatively large inductance without a magnetic field and without coils can be provided in accordance with the present invention. Such an inductance is desirable, for example, in molecular electronic techniques where an inductance is not readily formed.

An object of the present invention is to provide an enhancing network of high efficiency for a reactance in a minimum space.

Another object of the present invention is to provide an inductance enhancing network which eliminates the saturation problems normally encountered in inductances using high permeability cores.

Another object of the present invention is to provide an inductance enhancing circuit having a comparatively high figure of merit or circuit Q.

Another object of the present invention is to provide an enhancing network wherein extremely high values of inductance or capacitance can be obtained with comparatively small physical inductors or capacitors.

Further objects and advantages of the present invention will be readily apparent from the following detailed description taken in conjunction with the drawing in which.

Figure 1:
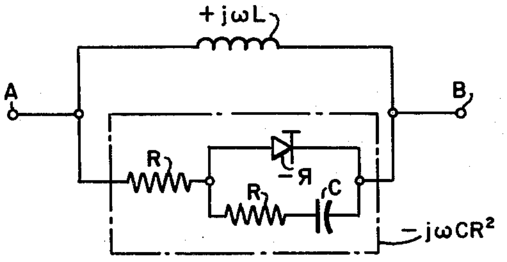
FIGURE 1 is a schematic diagram of an illustrative embodiment of the present invention.

The present invention may best be understood with reference to FIG. 1 which shows an inductance enhancing network wherein a positive inductance L and a negative inductance $CR^2$ are connected in parallel across the network terminals A, B. Assuming all resistive elements

2 to be approximately equal, the admittance $Y_{AB}$ is given by the following equation:

$$Y_{AB}=\frac{1}{j\omega L}-\frac{1}{j\omega CR^2} \qquad (1)$$

from which it can be seen that the network reactance $X_{AB}$ is equal to the product of the positive and negative inductances divided by the differences, as shown by:

$$X_{AB}=\frac{LCR^2}{CR^2-L} \qquad (2)$$

On examining Equation 2, showing the value of the inductive reactance $X_{AB}$, it is to be noted that the value of the positive and negative inductances can be made similar and thus the denominator of the equation can approach zero, in which case the inductive reactances $X_{AB}$ will approach infinity. It has been found that considerable enhancement of the original inductance L can be obtained practically and thus very large inductances in very small space for filtering and tuning can be provided.

Figure 2:
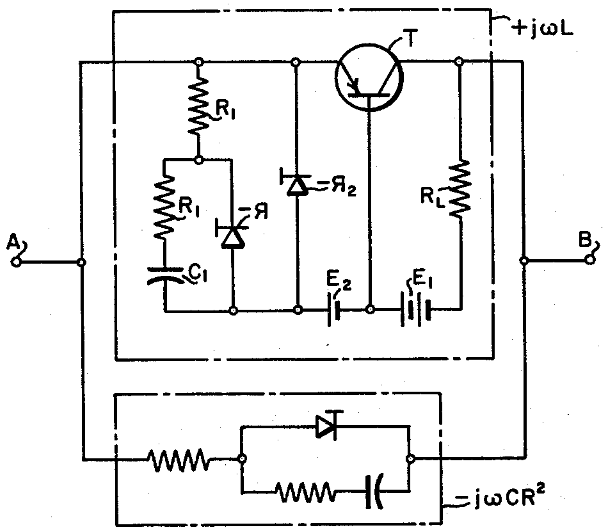
FIG. 2 is a schematic diagram of an alternate embodiment of the present invention.

The arrangement in FIG. 1 assumes the use of a comparatively small positive inductance L. FIG. 2 shows an arrangement which provides inductances as large as obtained in the embodiment shown in FIG. 1; however, in this instance there is no actual inductance used in the enhancing network. As described and claimed in my copending application, Serial No. 63,869, filed October 20, 1960, now abandoned, and assigned to the same assignee a positive inductance network can be produced by the use of a negative reactance and an active transformer. A network in accordance with this copending application Serial No. 63,869, is shown connected between the terminals A, B in the upper portion of FIG. 2. A negative inductance having a magnitude $C_1R_1^2$ is connected to the amplifier T. The amplifier T is illustrated as a transistor having an emitter electrode, base electrode and collector electrode. A load resistance $R_L$ is connected in series circuit relationship with the biasing potential $E_1$ across the collector-base circuit of the transistor. The negative inductance acting as an input impedance to the amplifier T is connected in series circuit relationship with a biasing potential $E_2$ across the emitter-base circuit of the transistor. The transistor has an undesirable emitter input resistance which is readily compensated for by the tunnel diode negative resistance $-\mathfrak{R}_2$ which also connects the biasing potential $E_2$ in series circuit relationship across the emitter-base circuit of the transistor. The tunnel diode used in accordance with the present invention have been designated as $-\mathfrak{R}$ to indicate the dynamic negative resistance provided by these diodes. It is to be understood that the tunnel diodes have a voltage thereacross of sufficient magnitude to cause them to be biased into the negative region of their voltage-current characteristic curve. The negative inductance connected as the input impedance to the amplifier T is provided by the combination of positive resistance elements, $R_1$, the negative resistance element $-\mathfrak{R}_1$, and the capacitance element $C_1$ and has a magnitude $C_1R_1^2$ as described and claimed in the aforementioned application, Serial No. 63,866. The amplifier T is herein illustrated as a common base amplifier which transforms the negative inductance input impedance thereto to a positive impedance of magnitude $+j\omega L$ across the terminals A, B in the upper portion of FIG. 2.

The bottom half of the circuit shown in FIG. 2, however, has an inductive reactance of magnitude $-CR^2$ which can be preselected to be substantially equal to the magnitude L of the inductive reactance of the upper portion of FIG. 2. Thus, the two reactances in parallel will cancel each other in the denominator of Equation 2 and thereby provide an extremely high inductive reactance $X_{AB}$ between the terminals A and B. It is significant that extremely high inductance values can be obtained by this circuit without producing a magnetic field at all. An inductance in the sense of Lenz's law is not present since there is no change in magnetic flux with the change of current, but as the current increases in the upper portion or leg, it reduces in the other and therefore provides a high impedance between terminals A and B. The fact that no actual magnetic phenomena is associated with FIG. 2 eliminates the saturation problems normally encountered in inductances using high permeability cores. The only limitation in this circuit is in the voltage and current handling ability of the positive and negative resistance and the break down voltage of the capacitances. Because of the resistance cancellation availability in the positive and negative resistances, comparatively high figure of merits or circuit Q can be obtained for the artificial inductance across the terminals A, B.

Figure 3:
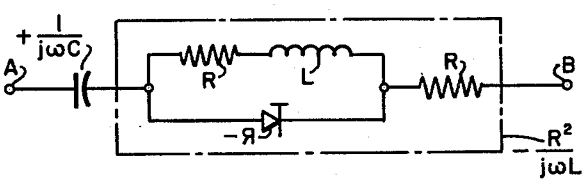
FIG. 3 is a schematic diagram of still another illustrative embodiment of the present invention.

FIG. 3 shows the enhancement of a capacitive reactance across the terminals A, B by connecting a normal capacitor having an impedance $1/j\omega C$ and an artificial negative capacitance having an impedance $-R^2/j\omega L$, in series circuit combination. The impedance of the network shown in FIG. 3 is given by the equation:

$$Z_{AB}=\frac{1}{j\omega C}-\frac{R^2}{j\omega L}$$

$$Z_{AB}=\frac{L-CR^2}{j\omega CL} \quad (3)$$

which shows that the impedance $Z_{AB}$ can approach zero and thus the capacitance $C_{AB}$, as given in Equation 4, $$C_{AB}=CL/L-CR^2 \quad (4)$$

approaches infinity. It is to be noted that while an actual inductance L is shown as part of the negative capacitance in FIG. 3 that the inductance enhancing network shown in FIG. 2 may be inserted in its place by merely connecting the terminals A and B shown in FIG. 2 between the positive resistance elements R in FIG. 3. With this arrangement it is readily seen that a capacitive enhancing network is provided without an inductor and hence is obtainable without producing a magnetic field.

Thus, it is readily apparent that the present invention provides enhancing networks having major significance in many applications such as filtering, long-term integration, and for providing resonances at extremely low frequencies.

While the present invention has been described with a particular degree of exactness for the purposes of illustration, it is to be understood that all alternations, equivalents, and modifications within the spirit and scope of the present invention are herein meant to be included.

I claim as my invention:

1. A two terminal reactance enhancing nework comprising, in combination; a first reactance of predetermined sense and a second reactance of opposite sense connected in shunt relationship across said terminals; said second reactance comprising a series circuit combination of a reactance of opposite frequency dependence to said first reactance and a first positive resistance; a negative resistance connected in a parallel circuit combination with said series circuit combination; a series circuit relationship comprising a second positive resistance and said parallel circuit combination connected across said terminals; the magnitude of said negative resistance preselected to be substantially equal to each said positive resistance; the product of the magnitude of said reactance of opposite frequency dependence and the square of the magnitude of said positive resistance being selected to be substantially equal to the magnitude of said first reactance of predetermined sense whereby the first reactance is substantially enhanced across said terminals.

2. A two terminal inductance enhancing network comprising, in combination; a first inductance of predetermined sense and a second inductance of opposite sense connected in shunt relationship across said terminals; said second inductance comprising a series circuit combination of a capacitance and a first positive resistance, a negative resistance connected in a parallel circuit combination with said series circuit combination; a series circuit relationship comprising a second postive resistance and said parallel circuit combination; the magnitude of said negative resistance preselected to be substantially equal to each said positive resistance; the product of the magnitude of said capacitance and the square of the magnitude of said positive resistance being preselected to be substantially equal to the magnitude of said first inductance of said predetermined sense whereby the first inductance is substantially enhanced across said terminals.

References Cited by the Examiner

UNITED STATES PATENTS

| | | | |
|---|---|---|---|
| 1,815,838 | 7/1931 | Dolmage | 333—80 |
| 1,903,610 | 4/1933 | Dolmage | 333—80 |
| 2,788,496 | 4/1957 | Linvill | 333—80 |
| 2,933,703 | 4/1960 | Kinariwala | 333—80 |
| 3,013,225 | 12/1961 | Ouchi | 333—80 |
| 3,127,567 | 3/1964 | Chang | 333—80 |
| 3,127,574 | 3/1964 | Sommers | 333—80 |

FOREIGN PATENTS 278,036 9/1927 Great Britain.

OTHER REFERENCES

Schultz: "Amplifier Design," Electronics, May 27, 1960, pages 110–112 relied on.

Vernam: "Negative Circuit Constants," Proc. Institute of Radio Engineers, vol. 19, No. 4, April 1931, pp. 676–681.

Sommers: "Tunnel Diodes," Proceeding of IRE, July 1959, pages 201–206.

HERMAN KARL SAALBACH, *Primary Examiner.*

BENNETT G. MILLER, *Examiner.*

A. J. ENGLERT, W. K. TAYLOR, *Assistant Examiners.*